US012333349B2

(12) United States Patent
Chen et al.

(10) Patent No.: US 12,333,349 B2
(45) Date of Patent: Jun. 17, 2025

(54) MULTIPLE METRIC-BASED WORKLOAD BALANCING BETWEEN STORAGE RESOURCES

(71) Applicant: Dell Products L.P., Round Rock, TX (US)

(72) Inventors: Chi Chen, Chengdu (CN); Huijuan Fan, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 331 days.

(21) Appl. No.: 17/335,293

(22) Filed: Jun. 1, 2021

(65) Prior Publication Data
US 2022/0357998 A1   Nov. 10, 2022

(30) Foreign Application Priority Data

May 8, 2021   (CN) .......................... 202110501884.9

(51) Int. Cl.
| G06F 9/46 | (2006.01) |
|---|---|
| G06F 3/06 | (2006.01) |
| G06F 9/50 | (2006.01) |

(52) U.S. Cl.
CPC .......... *G06F 9/5083* (2013.01); *G06F 3/0613* (2013.01); *G06F 3/0635* (2013.01);
(Continued)

(58) Field of Classification Search
CPC .... G06F 9/5083; G06F 9/5016; G06F 3/0613; G06F 3/0635; G06F 3/0647; G06F 3/067; G06F 2209/5022; G06F 2209/508
See application file for complete search history.

(56) References Cited

U.S. PATENT DOCUMENTS

| 6,055,640 A | * | 4/2000 | Kageshima | ............... G06F 9/30 |
|---|---|---|---|---|
| | | | | 711/119 |
| 6,457,139 B1 | * | 9/2002 | D'Errico | ............... G06F 3/0683 |
| | | | | 710/305 |

(Continued)

FOREIGN PATENT DOCUMENTS

| CN | 106293871 A | * | 1/2017 | ......... G06F 9/45533 |
|---|---|---|---|---|
| CN | 106599308 A | * | 4/2017 | .......... G06F 16/164 |

(Continued)

OTHER PUBLICATIONS

Definition of Trend by Merriam-Webster, Apr. 17, 2021, Merriam-Webster.com (Year: 2021).*

(Continued)

*Primary Examiner* — April Y Blair
*Assistant Examiner* — Zhi Chen
(74) *Attorney, Agent, or Firm* — Ryan, Mason & Lewis, LLP

(57) ABSTRACT

An apparatus comprises a processing device configured to determine a workload level of each storage resource in a set of two or more storage resources, the workload levels being based at least in part on a processor performance metric, a memory performance metric, and a load performance metric. The processing device is also configured to identify a performance imbalance rate for the set of two or more storage resources, and to perform workload balancing for the set of two or more storage resources responsive to (i) the performance imbalance rate for the set of two or more storage resources exceeding a designated imbalance rate threshold and (ii) at least one storage resource in the set of two or more storage resources having a workload level exceeding a designated threshold workload level.

20 Claims, 8 Drawing Sheets

(52) U.S. Cl.
CPC ............ *G06F 3/0647* (2013.01); *G06F 3/067* (2013.01); *G06F 9/5016* (2013.01); *G06F 2209/5022* (2013.01); *G06F 2209/508* (2013.01)

(56) References Cited

U.S. PATENT DOCUMENTS

| | | | | |
|---|---|---|---|---|
| 8,539,197 | B1* | 9/2013 | Marshall | G06F 3/0613 |
| | | | | 711/112 |
| 9,218,196 | B2* | 12/2015 | Boss | G06F 9/4862 |
| 9,411,819 | B1* | 8/2016 | Long | H04L 61/457 |
| 9,817,657 | B2* | 11/2017 | Hill | G06F 8/70 |
| 2002/0164962 | A1* | 11/2002 | Mankins | G08G 1/127 |
| | | | | 455/99 |
| 2006/0069665 | A1* | 3/2006 | Yamakawa | H04L 67/1029 |
| 2009/0328050 | A1* | 12/2009 | Liu | G06F 9/5088 |
| | | | | 718/104 |
| 2011/0093584 | A1* | 4/2011 | Qiu | H04L 61/4511 |
| | | | | 709/224 |
| 2012/0005423 | A1* | 1/2012 | Zhuang | G06F 3/0653 |
| | | | | 711/E12.001 |
| 2014/0309039 | A1* | 10/2014 | Yoshida | A63F 13/35 |
| | | | | 463/42 |
| 2015/0278243 | A1* | 10/2015 | Vincent | G06F 16/182 |
| | | | | 707/634 |
| 2016/0285712 | A1* | 9/2016 | Mankovskii | H04L 67/02 |
| 2018/0165238 | A1* | 6/2018 | Depew | G06F 11/349 |
| 2018/0288094 | A1* | 10/2018 | Ahuja | H04L 63/1408 |
| 2018/0302480 | A1* | 10/2018 | Xu | H04L 67/1027 |
| 2019/0253490 | A1* | 8/2019 | Du | H04L 67/1008 |
| 2019/0332271 | A1* | 10/2019 | Abouelwafa | G06F 3/064 |
| 2021/0036963 | A1* | 2/2021 | Gao | H04L 47/527 |
| 2021/0255959 | A1* | 8/2021 | Abe | G06F 9/5016 |
| 2021/0321123 | A1* | 10/2021 | Strandby | H04N 19/436 |
| 2022/0286853 | A1* | 9/2022 | Koral | H04W 12/122 |
| 2022/0300471 | A1* | 9/2022 | Srinivasan | G06F 16/217 |

FOREIGN PATENT DOCUMENTS

| | | | | |
|---|---|---|---|---|
| CN | 110704542 A | * | 1/2020 | .......... G06F 11/3024 |
| CN | 110943887 A | * | 3/2020 | ............. H04L 43/50 |
| WO | WO-2013152216 A1 | * | 10/2013 | ........... G06F 9/5088 |
| WO | WO-2022157793 A1 | * | 7/2022 | |

OTHER PUBLICATIONS

NVM Express, "NVM Express, Revision 1.3," NVM Express, May 1, 2017, 282 pages.

Dell EMC, "Dell EMC Unity: High Availability," White Paper, Jan. 2019, 23 pages.

Dell EMC, "Configuring Hosts to Access SMB File Systems," Dell EMC Unity Family Version 4.5, P/N 302-002-566 REV 04, Jan. 2019, 52 pages.

Dell EMC, "Configuring Hosts to Access NFS File Systems," Dell EMC Unity Family Version 5.x, 302-002-567 REV 02, Jun. 2019, 16 pages.

Dell EMC, "Dell EMC Unity: Understanding Storage Processor High Availability (User Correctable)" https://www.dell.com/support/kbdoc/en-us/printview/000023822/10/en, Nov. 20, 2020, 3 pages.

* cited by examiner

MULTIPLE METRIC-BASED WORKLOAD BALANCING BETWEEN STORAGE RESOURCES

RELATED APPLICATION

The present application claims priority to Chinese Patent Application No. 202110501884.9, filed on May 8, 2021 and entitled "Multiple Metric-Based Workload Balancing Between Storage Resources," which is incorporated by reference herein in its entirety.

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input-output (TO) operation requests for delivery to the storage systems. Storage controllers of the storage systems service such requests for IO operations. In some information processing systems, multiple storage systems may be used to form a storage cluster.

SUMMARY

Illustrative embodiments of the present disclosure provide techniques for performing multiple metric-based workload balancing between storage resources.

In one embodiment, an apparatus comprises at least one processing device comprising a processor coupled to a memory. The at least one processing device is configured to perform the step of determining a workload level of each storage resource in a set of two or more storage resources, the workload levels being based at least in part on a processor performance metric, a memory performance metric, and a load performance metric. The at least one processing device is also configured to perform steps of identifying a performance imbalance rate for the set of two or more storage resources, and performing workload balancing for the set of two or more storage resources responsive to (i) the performance imbalance rate for the set of two or more storage resources exceeding a designated imbalance rate threshold and (ii) at least one storage resource in the set of two or more storage resources having a workload level exceeding a designated threshold workload level. Performing workload balancing for the set of two or more storage resources comprises migrating one or more workloads from the at least one storage resource in the set of two or more storage resources having the workload level exceeding the designated threshold workload level to one or more other storage resources in the set of two or more storage resources.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
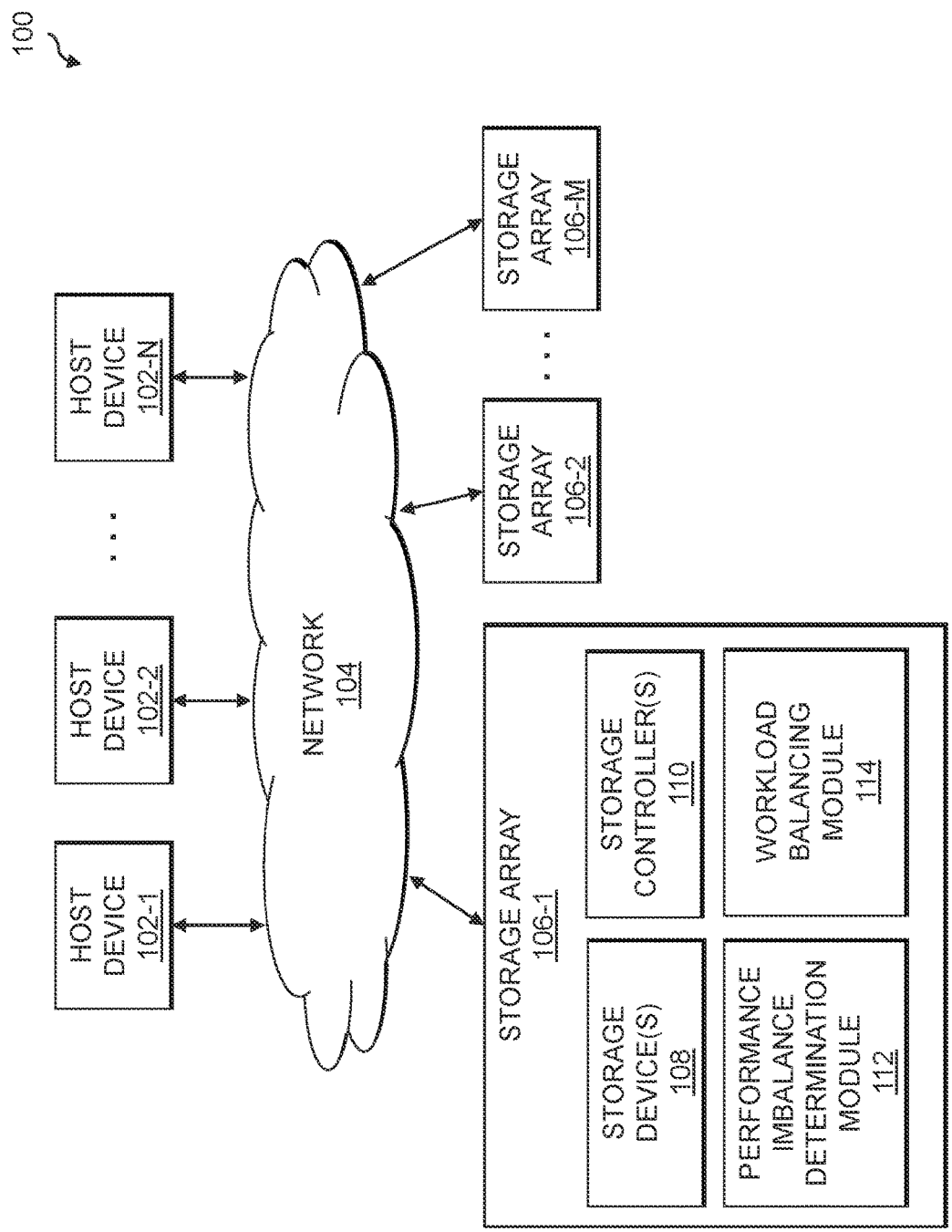
FIG. 1 is a block diagram of an information processing system configured for performing multiple metric-based workload balancing between storage resources in an illustrative embodiment.

FIG. 1 shows an information processing system 100 configured in accordance with an illustrative embodiment to provide functionality for performing multiple metric-based workload balancing between storage resources. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate 10 processing for the storage devices 108. The storage controllers 110 are examples of what is more generally referred to herein as storage processors. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given 10 operation as that term is broadly used herein illustratively comprises one or more such commands. References herein to terms such as "input-output" and "IO" should be understood to refer to input and/or output. Thus, an 10 operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

In the information processing system 100 of FIG. 1, the storage arrays 106 are assumed to implement network attached storage (NAS) servers, or other types of storage servers, through which the host devices 102 access filesystems. NAS servers, for example provide file-level storage servers used to host filesystems (e.g., a NAS server is used to create filesystems that use Server Message Block (SMB) or Network File System (NFS) shares). The NAS servers may be implemented or run on different storage processors (e.g., different storage controllers 110) of the storage array 106-1. Workload balancing between such storage processors may be achieved by moving NAS servers between the storage processors. Such workload balancing functionality is provided via a performance imbalance determination module 112 and a workload balancing module 114.

The performance imbalance determination module 112 is configured to measure or otherwise determine the performance of each storage processor of the storage array 106-1, where the performance may be characterized using multiple metrics (e.g., CPU usage, memory usage, IO load). In some embodiments, the performance imbalance determination module 112 is also configured to measure or otherwise determine the performance of one or more storage processors of one or more other ones of the storage arrays 106-2 through 106-M. The performance imbalance determination module 112 is further configured to determine when there is more than a designated threshold performance imbalance rate between two or more of the storage processors of the storage array 106-1 (or between one or more storage processors of the storage array 106-1 and one or more storage processors of one or more other ones of the storage arrays 106-2 through 106-M). On determining that there is more than the designated threshold performance imbalance rate, the workload balancing module 114 initiates one or more workload balancing operations. Such workload balancing operations may include, for example, moving one or more NAS servers between different ones of the storage processors of the storage array 106-1 (or between one or more storage processors of the storage array 106-1 and one or more storage processors of one or more other ones of the storage arrays 106-2 through 106-M).

At least portions of the functionality of the performance imbalance determination module 112 and the workload balancing module 114 may be implemented at least in part in the form of software that is stored in memory and executed by a processor.

Although shown as being implemented internal to the storage array 106-1 and outside the storage controllers 110 in the FIG. 1 embodiment, it should be appreciated that the performance imbalance determination module 112 and the workload balancing module 114 may be implemented at least in part internal to the storage controllers 110, or at least in part external to the storage array 106-1 such as on one or more of the host devices 102 or on a server or other processing platform external to the storage array 106-1 (e.g., including a cloud computing platform). Further, it should be appreciated that other ones of the storage arrays 106-2 through 106-M may implement instances of the performance imbalance determination module 112 and the workload balancing module 114.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of one or more of the host devices 102 and the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement 10 operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 and other portions of the system 100 may in some embodiments be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 may be implemented at least in part in the first geographic location, the second geographic location, and one or more other geographic locations. Thus, it is possible in some implementations of the system 100 for different ones of the host devices 102 and the storage arrays 106 to reside in different data centers.

Numerous other distributed implementations of the host devices 102 and the storage arrays 106 are possible. Accordingly, the host devices 102 and the storage arrays 106 can also be implemented in a distributed manner across multiple data centers.

Additional examples of processing platforms utilized to implement portions of the system 100 in illustrative embodiments will be described in more detail below in conjunction with FIGS. 6 and 7.

It is to be understood that the particular set of elements shown in FIG. 1 for performing multiple metric-based workload balancing between storage resources is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for performing multiple metric-based workload balancing between storage resources will now be described in more detail with reference to the flow diagram of FIG. 2. It is to be understood that this particular process is only an example, and that additional or alternative processes for performing multiple metric-based workload balancing between storage resources may be used in other embodiments.

In this embodiment, the process includes steps 200 through 204. These steps are assumed to be performed by the performance imbalance determination module 112 and the workload balancing module 114. The process begins with step 200, determining a workload level of each storage resource in a set of two or more storage resources, the workload levels being based at least in part on a processor performance metric, a memory performance metric, and a load performance metric. The set of two or more storage resources may comprise two or more storage processors of a single storage system, or two or more two or more storage processors of two or more storage systems.

The processor performance metric may comprise a weighted sum of two or more processor usage metrics associated with two or more different time intervals. The two or more processor usage metrics associated with the two or more different time intervals may comprise: a first processor usage metric characterizing a current state of processor usage of a given storage resource for a first time period relative to a current time; a second processor usage characterizing a recent state of processor usage of the given storage resource for a second time period relative to the current time, the second time period being longer than the first time period; and a third processor usage characterizing a persistent state of processor usage of the given storage resource for a third time period relative to the current time, the third time period being longer than the second time period.

The memory performance metric may comprise a weighted sum of two or more memory usage metrics associated with two or more different times. The two or more memory usage metrics associated with the two or more different times may comprise: a first memory usage metric characterizing a percentage of memory usage of a given storage resource at a first point in time relative to a current time; a second memory usage metric characterizing a percentage of memory usage of the given storage resource at a second point in time relative to the current time, the second point in time being less recent than the first point in time; and a third memory usage metric characterizing a percentage of memory usage of the given storage resource at a third point in time relative to the current time, the third point in time being less recent than the second point in time. Each of the two or more memory usage metrics comprises a sum of a main memory usage, a cache memory usage, and a buffer memory usage for one of the two or more different times.

The load performance metric may comprise a weighted sum of two or more load metrics associated with two or more different times. The two or more load metrics associated with the two or more different times comprise: a first load metric characterizing a percentage of load of a given storage resource at a first point in time relative to a current time; a second load metric characterizing a percentage of load of the given storage resource at a second point in time relative to the current time, the second point in time being less recent than the first point in time; and a third load metric characterizing a percentage of load of the given storage resource at a third point in time relative to the current time, the third point in time being less recent than the second point in time. Each of the two or more load metrics may comprises a sum of an input-output operations per second metric and a bandwidth metric for one of the two or more different times, the input-output operations per second metric may be represented as a percentage of a designated maximum input-output operations per second, and the bandwidth metric may be represented as a percentage of a designated maximum bandwidth.

Figure 2:
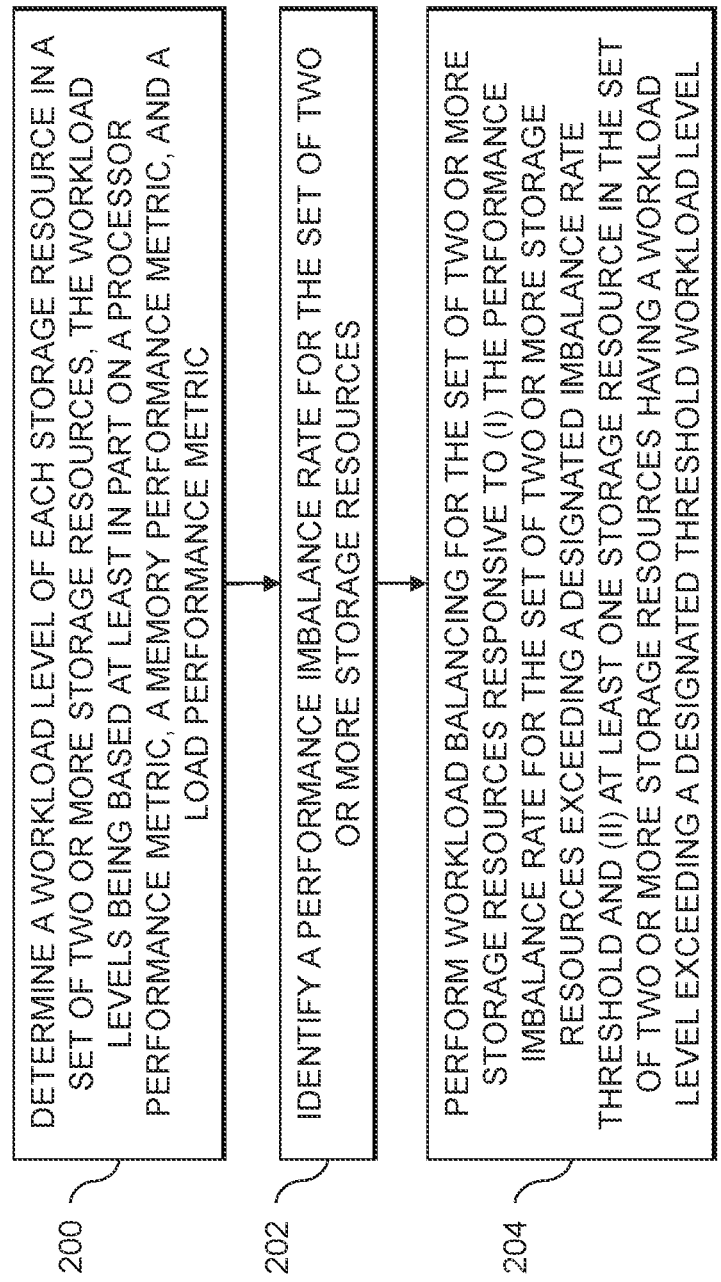
FIG. 2 is a flow diagram of an exemplary process for performing multiple metric-based workload balancing between storage resources in an illustrative embodiment.

The FIG. 2 process continues with step 202, identifying a performance imbalance rate for the set of two or more storage resources. In step 204, workload balancing is performed for the set of two or more storage resources responsive to (i) the performance imbalance rate for the set of two or more storage resources exceeding a designated imbalance rate threshold and (ii) at least one storage resource in the set of two or more storage resources having a workload level exceeding a designated threshold workload level. Performing workload balancing for the set of two or more storage resources comprises migrating one or more workloads from the at least one storage resource in the set of two or more storage resources having the workload level exceeding the designated threshold workload level to one or more other storage resources in the set of two or more storage resources.

Step 204 may comprise migrating one or more NAS servers running on the at least one storage resource in the set of two or more storage resources having the workload level exceeding the designated threshold workload level to the one or more other storage resources in the set of two or more storage resources. Migrating the one or more NAS servers running on the at least one storage resource in the set of two or more storage resources having the workload level exceeding the designated threshold workload level to the one or more other storage resources in the set of two or more storage resources may comprise performing one or more iterations of: selecting a given network attached storage server running on a first storage resource having a first workload level exceeding the designated threshold workload level based at least in part on a sum of workloads of filesystems created on the given network attached storage server; pausing one or more replication sessions on the given network attached storage server; changing an owner of the given network attached storage server from the first storage resource to a second storage resource, the second storage resource having a second workload level lower than the first workload level; re-calculating workload levels of the first storage resource and the second storage resource; and rolling back the change of owner of the given network attached storage server responsive to the re-calculated second workload level of the second storage resource exceeding the re-calculated first workload level of the first storage resource.

Load balancing between storage arrays or storage servers may focus on using link-aggregation to balance network load. For example, a NAS server may provide load balancing functionality that focuses on using link-aggregation to balance the network load. Balancing the network load, however, does not handle imbalances in memory, CPU, IO or other usage of storage processors (SPs) of different storage arrays or storage servers. Such memory, CPU, IO or other imbalances may lead to system-level issues such as overloaded SPs, out of memory (OOM) conditions, deadlock, SP panic, etc.

Illustrative embodiments provide techniques for utilizing a multiple metric-based workload balancing algorithm for storage systems. The multiple metric-based workload balancing algorithm takes into account multiple metrics, such as CPU usage, memory (e.g., main memory, cache, buffer, etc.) usage, IO load (e.g., IOPS, bandwidth), etc. On detecting designated imbalance conditions, the multiple metric-based workload balancing algorithm can trigger workload balancing actions. Workload balancing actions may be initiated between SPs (e.g., within a same storage array or storage system, between two or more storage arrays or storage systems). This may include, for example, moving a NAS server between SPs to achieve better file performance and overall system reliability. Advantageously, such an approach provides improved balancing relative to approaches that consider only link-aggregation and utilizing network interface card (NIC) grouping or teaming to achieve network-level balancing.

In some use case scenarios, a user (e.g., a storage administrator, a storage customer or other end-user, etc.) may create multiple NAS servers and filesystems. The user needs to estimate the workload of those NAS servers and filesystems when configuring storage arrays to achieve load balancing between the SPs on which the NAS servers run. Generating an accurate estimation, however, is a difficult task particularly as the number of NAS servers and number of filesystems increase. Further, such an estimation is static. Load may change dynamically over time, and thus workload imbalance is likely or inevitable if the NAS servers and filesystems are configured using a static workload estimation. If workload imbalance between SPs becomes too large, this may lead to various performance issues, including IO Quality of Service (QoS) decreasing. Workload imbalance can also lead to various system-level issues for an overloaded SP, such as OOM, deadlock, SP panic, etc.

Figure 3:
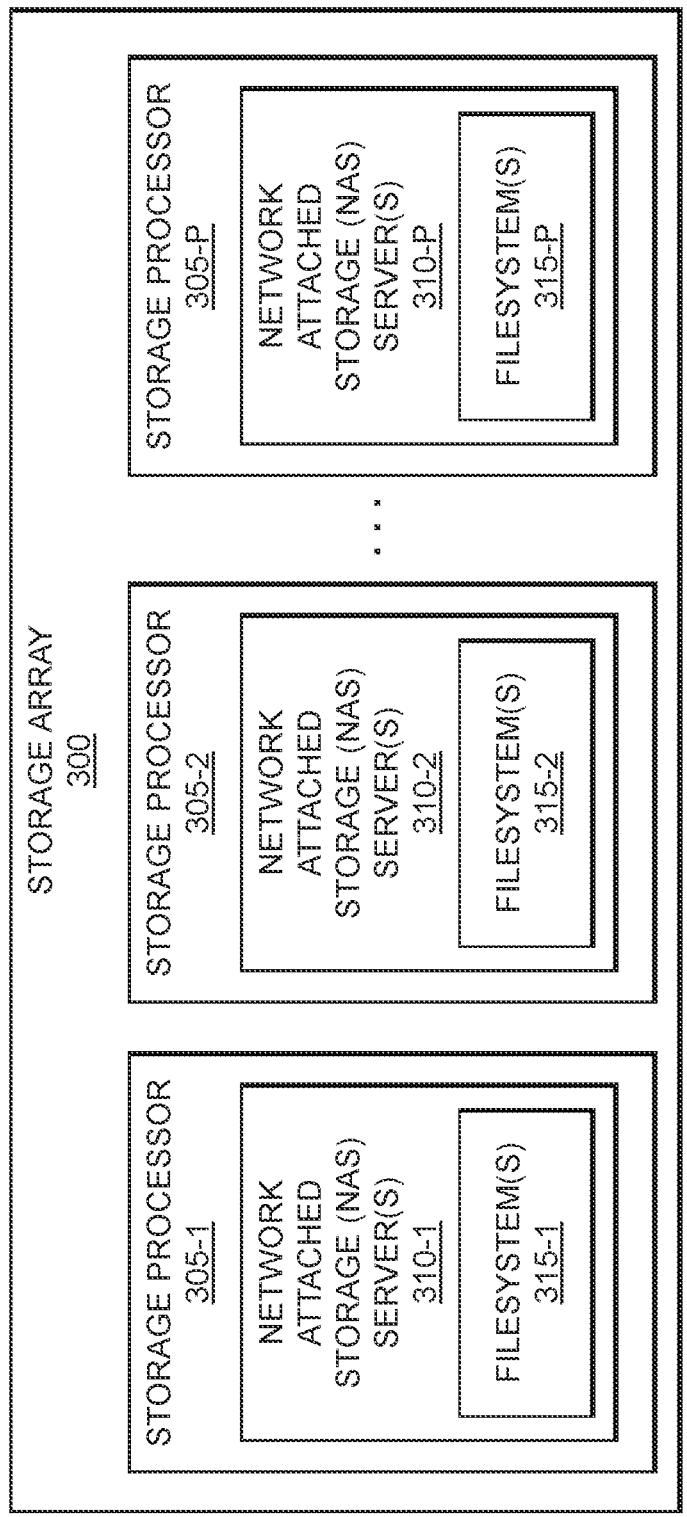
FIG. 3 shows a storage array with multiple storage processors implementing network attached storage servers and associated filesystems in an illustrative embodiment.

FIG. 3 shows an example of a storage array 300 including a number of SPs 305-1, 305-2, . . . 305-P (collectively, SPs 305) each running one or more NAS servers 310-1, 310-2, . . . 310-P (collectively, NAS servers 310) with associated sets of filesystems 315-1, 315-2, . . . 315-P (collectively, filesystems 315). Although FIG. 3 shows an example where each of the SPs 305 implements or runs a set of NAS servers 310, this is not a requirement. For example, a storage array may include multiple SPs, with only a subset of the SPs implementing or running NAS servers. Further, each SP 305 may implement or run a different number of NAS servers 310 and associated filesystems 315. For example, the SP 305-1 may run two NAS servers 310, while the SP 305-2 may run a single NAS server 310 (or more than two NAS servers 310). Further, each of the NAS servers 310 may be associated with any desired number of filesystems 315. In some cases, there is a one-to-one relationship between the NAS servers 310 and filesystems 315 (e.g., each NAS server 310 is associated with one of the filesystems 315). In other cases, one or more of the NAS servers 310 may be associated with more than one of the filesystems 315. Still further, NAS servers and filesystems are not limited to being deployed or run on a single storage array. A user may configure multiple storage arrays, each including one or more SPs which run or implement one or more NAS servers and associated filesystems. In some embodiments, NAS servers may be implemented external to storage arrays (e.g., such as on dedicated servers, using a cloud computing platform, etc.).

In some embodiments, a dynamic multiple metric-based workload balancing algorithm is utilized for NAS or other types of storage servers or more generally storage systems. The dynamic multiple metric-based workload balancing algorithm takes multiple metrics into consideration, including CPU usage, memory usage (e.g., main memory usage, cache usage, buffer usage), IO load (e.g., IOPS, bandwidth, etc.), to trigger workload balancing operations between SPs. Such workload balancing operations may include moving NAS servers between SPs when the workload metrics between a first SP and a second SP exceed some designated workload imbalance threshold. A minimum load threshold may also be defined, where if a SP's load is below the minimum load threshold, then balancing is not triggered (e.g., as it is assumed that the SP can handle its own load when below the minimum load threshold). In some cases, different minimum load thresholds may be defined for each SP, each storage array, etc. The dynamic multiple metric-based workload balancing algorithm can leverage SP resources to get better file performance and system reliability, avoiding various undesirable conditions (e.g., OOM issues).

Performance of a storage array or storage system may be measured using various criteria, including CPU usage, memory usage, and IO load. These criteria may be defined with more detail as described below. If any single one of or combination of such criteria is too high (e.g., as defined using respective thresholds), it may cause performance issues for its associated storage array or storage system, and possible errors. To evaluate the performance or total workload of a SP, a weighted criterion method is utilized based on the criteria of CPU usage, memory usage and IO load:

$$C = \omega_{CPU} \cdot P_{CPU} + \omega_{Mem} \cdot P_{Mem} + \omega_{IO} \cdot P_{IO}$$

where $P_{CPU}$, $P_{Mem}$ and $P_{IO}$ represent CPU usage percentage, memory usage percentage and IO load percentage, respectively, where $\omega_{CPU}$, $\omega_{Mem}$ and $\omega_{IO}$ represent weights of the CPU usage, memory usage and IO load criteria, respectively, and where $\omega_{CPU} + \omega_{Mem} + \omega_{IO} = 1$. By tuning the weights, better overall balancing results may be achieved. The particular values of the weights may be selected based on the use case. In some embodiments, $\omega_{CPU}$, $\omega_{Mem}$ and $\omega_{IO}$ are assigned values of 0.34, 0.33, and 0.33, respectively, by default. In some use cases, the default weight values may be used initially, with the weight values being tuned over time based on real-world use data to achieve better overall balancing results. Such a tuning process may be used for some or all of the sets of weights described herein. The higher the total workload evaluation value C is, the worse performance the SP has.

For CPU performance evaluation, some embodiments take average CPU usage into consideration which represents the average system load over a period of time. In Unix and Linux-based systems, average CPU usage may appear in the form of three numbers representing the system load during the last one minute period, the last five minute period, and the last fifteen minute period (e.g., denoted as $P_{CPU,1\ min}$, $P_{CPU,5\ min}$ and $P_{CPU,15\ min}$, respectively). Generally, $P_{CPU,1\ min}$ reflects the system current state, $P_{CPU,5\ min}$ reflects the system recent state, and $P_{CPU,15\ min}$ reflects the system persistent state. If $P_{CPU,15\ min}$, $P_{CPU,5\ min}$ and $P_{CPU,1\ min}$ show an increasing or decreasing trend, it means that the CPU performance is becoming worse or better over time. If $P_{CPU,1\ min} \approx P_{CPU,5\ min} \approx P_{CPU,15\ min}$, it means that the CPU performance is staying the same over time (e.g., busy or free).

With different time series of CPU usage (e.g., random, period, etc.), the $CPU_{15\ min}$, $CPU_{5\ min}$ and $CPU_{1\ min}$ parameters may have different meanings to the whole or overall CPU performance. In some embodiments, a weighted average CPU usage percentage for the last one, five and fifteen minute periods is utilized:

$$P_{CPU\ average} = \lambda_1 \cdot P_{CPU,1\ min} + \lambda_2 \cdot P_{CPU,5\ min} + \lambda_3 \cdot P_{CPU,15\ min}$$

where $\lambda_1$, $\lambda_2$ and $\lambda_3$ represent weights of CPU usage percentage during the last one, five and fifteen minute periods, respectively, and where $\lambda_1 + \lambda_2 + \lambda_3 = 1$. By tuning the weights $\lambda_1$, $\lambda_2$ and $\lambda_3$, better overall average CPU usage performance metrics may be obtained. By default, $\lambda_1$, $\lambda_2$ and $\lambda_3$ may be assigned values of 0.44, 033 and 0.23, respectively. It should be noted that although the above description assumes use of CPU usage percentage measures for the last one, five and fifteen minute periods, this is not a requirement. Other embodiments may utilize only a subset of these time periods, or may use one or more other time periods in addition to or in place of one or more of these time periods. Advantageously, CPU performance metrics may be obtained using system application programming interfaces (APIs).

Figure 4:
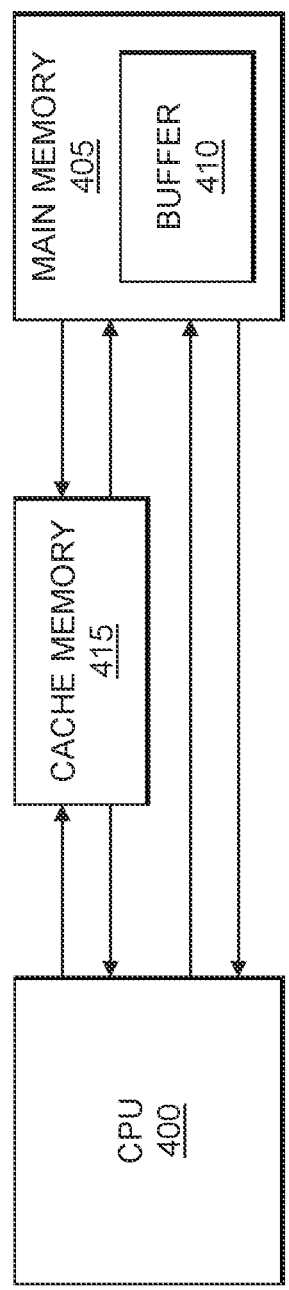
FIG. 4 shows a memory architecture including a main member, cache memory and a buffer in an illustrative embodiment.

Memory performance evaluation may consider multiple factors, including main memory usage, cache memory usage and buffer usage. Main memory, which is often referred to simply as memory, is directly accessible to the CPU. The CPU may continuously read instructions stored in the main memory and execute them as required. Any data actively operated on is also stored in the main memory in a uniform manner. Cache memory is used to reduce the average time to access data from the main memory, and may be used to realize performance increases for transfers of data that is being repeatedly transferred. The buffer is used to compensate for the differences in speed between processes or devices that exchange data. Both the cache and buffer can have important influences on system performance. FIG. 4 shows an example structure of a CPU 400, main memory 405, buffer 410 and cache memory 415.

Similar to CPU usage performance evaluation, different memory usage states may have different meanings to the whole or overall memory performance. Considering that utilization and freeing up memory may take some time to achieve, a weighted average memory usage percentage may be considered at various times (e.g., now, 15 minutes ago, and 30 minutes ago):

$$P_{Mem\ average} = \mu_1 \cdot P_{Mem,now} + \mu_2 \cdot P_{Mem,15\ min} + \mu_3 \cdot P_{Mem,30\ min}$$

and $$P_{Mem,time\ i} = P_{mainMem,time\ i} + P_{cacheMem,time\ i} + P_{buffer,time\ i}$$

where $P_{Mem,now}$, $P_{Mem,15\ min}$ and $P_{Mem,30\ min}$ represent memory usage percentage now (e.g., current), 15 minutes ago and 30 minutes ago, respectively, where $\mu_1$, $\mu_2$ and $\mu_3$ represent weights of memory usage now, 15 minutes ago and 30 minutes ago, respectively, and where $\mu_1 + \mu_2 + \mu_3 = 1$. By tuning these weights, a better overall average memory usage performance metric may be obtained. The particular values of these weights may be selected by a user as desired for a particular use case scenario. By default, $\mu_1$, $\mu_2$ and $\mu_3$ may be assigned values of 0.44, 0.33, and 0.23, respectively. It should be noted that although the above description assumes use of now or current, 15 minutes ago and 30 minutes ago memory usage percentage measures, this is not a requirement. Other embodiments may utilize only a subset of these times, or may use one or more other times in addition to or in place of one or more of these times.

IO load performance may consider multiple factors, including IOPS and bandwidth. IOPS is an IO performance measurement used to characterize storage devices, and bandwidth is the amount of data that can be transmitted in a fixed amount of time (e.g., which may be expressed in terms of bits per second (bps), bytes per second, etc.). Similar to CPU and memory usage performance evaluation, IO load performance may be considered at multiple times (e.g., now, 5 minutes ago, and 15 minutes ago):

$$P_{IO\ average} = \xi_1 \cdot P_{IO,now} + \xi_2 \cdot P_{IO,5\ min} + \xi_3 \cdot P_{IO,15\ min}$$

and $$P_{IO,time\ i} = P_{IOPS,time\ i} + P_{Bandwidth,timeperiod\ i}$$

where $P_{IO,now}$, $P_{IO,5\ min}$ and $P_{IO,15\ min}$ represent IO load percentage now (e.g., current), 5 minutes ago and 15 minutes ago, respectively, where $\xi_1$, $\xi_2$, and $\xi_3$ represent weights of IO Load now, 5 minutes ago and 15 minutes ago, respectively, and where $\xi_1 + \xi_2 + \xi_3 = 1$. By tuning these weights, a better overall average IO load performance can be achieved. The particular values of these weights may be selected by a user as desired for a particular use case scenario. By default, $\xi_1$, $\xi_2$, and $\xi_3$ may be assigned values of 0.44, 0.33, and 0.23, respectively. It should be noted that although the above description assumes use of now or current, 5 minutes ago and 15 minutes ago memory usage percentage measures, this is not a requirement. Other embodiments may utilize only a subset of these times, or may use one or more other times in addition to or in place of one or more of these times.

In order to represent IOPS and bandwidth metrics in a percentage format similar to the CPU and memory metrics, the IOPS and bandwidth metrics may be enhanced or adjusted as follows:

$$P_{IOPS,time\ i} = \frac{IOPS_{time\ i}}{IOPS_{max}}$$

$$P_{Bandwidth,time\ i} = \frac{Bandwidth_{time\ i}}{Bandwidth_{max}}$$

where $IOPS_{max}$ represents the maximum theoretical IOPS value, and where $Bandwidth_{max}$ represents the maximum theoretical bandwidth value. A NAS server's IO load may be determined by summing the load for each filesystem associated with that NAS server:

$$P_{NAS\ server,IO\ average} = \sum_{all\ the\ FSs\ on\ the\ NAS\ server} P_{FS,IO\ average}$$

The dynamic multiple metric-based workload balancing algorithm, in some embodiments, takes into account the metrics described above for CPU usage, memory usage (e.g., main memory, cache, buffer) and IO load (e.g., IOPS and bandwidth) to trigger workload balancing actions in response to detecting designated imbalance conditions. As noted above, such workload balancing actions may include moving NAS servers between SPs when the performance of a given SP is (or is trending and predicted to be) below some designated threshold performance. In this way, SP resources can be leveraged to achieve better file performance and system while avoiding undesirable issues such as OOM issues. The dynamic multiple metric-based workload balancing algorithm will be described in further detail below using the following notation:

$$C = \omega_{CPU} \cdot P_{CPU\ average} + \omega_{Mem} \cdot P_{Mem\ average} + \omega_{IO} \cdot P_{IO\ average}$$

where C denotes the performance or total workload of SP i, and where $P_{CPU}$, $P_{Mem}$ and $P_{IO}$ denote CPU usage percentage, memory usage percentage and IO load percentage, respectively.

$$P_{CPU\ average} = \lambda_1 \cdot P_{CPU,1\ min} + \lambda_2 \cdot P_{CPU,5\ min} + \lambda_3 \cdot P_{CPU,15\ min}$$

where $P_{CPU\ average}$ denotes the weighted average CPU usage percentage, where $P_{CPU,1\ min}$, $P_{CPU,5\ min}$ and $P_{CPU,15\ min}$ denote CPU usage percentages for the last one, five and fifteen minute periods, respectively, where $\lambda_1$, $\lambda_2$ and $\lambda_3$ denote weights of the CPU usage percentage for the last one, five and fifteen minute periods, respectively, and where $\lambda_1 + \lambda_2 + \lambda_3 = 1$.

$$P_{Mem\ average} = \mu_1 \cdot P_{Mem,now} + \mu_2 \cdot P_{Mem,15\ min} + \mu_3 \cdot P_{Mem,30\ min}$$

where $P_{Mem\ average}$ denotes the weighted average memory usage percentage, where $P_{Mem,now}$, $P_{Mem,15\ min}$ and $P_{Mem,30\ min}$ denote memory usage percentage at now, 15 minutes ago and 30 minutes ago, respectively, where $\mu_1$, $\mu_2$ and $\mu_3$ denote weights of memory usage at now, 15 minutes ago and 30 minutes ago, respectively, and where $\mu_1 + \mu_2 + \mu_3 = 1$.

$$P_{Mem,time\ i} = P_{mainMem,time\ i} + P_{cacheMem,time\ i} + P_{buffer,time\ i}$$

where $P_{Mem,time\ i}$ denotes the memory usage for a time i, which is a sum of the main memory usage at time i denoted $P_{mainMem,time\ i}$, the cache usage at time i denoted $P_{cacheMem,time\ i}$, and the buffer usage at time i denoted $P_{buffer,time\ i}$.

$$P_{IO\ average} = \xi_1 \cdot P_{IO,now} + \xi_2 \cdot P_{IO,5\ min} + \xi_3 \cdot P_{IO,15\ min}$$

where $P_{IO\ average}$ denotes the weighted average IO load percentage, where $P_{IO,now}$, $P_{IO,5\ min}$ and $P_{IO,15\ min}$ denote IO load percentage at now, 5 minutes ago and 15 minutes ago, respectively, where $\xi_1$, $\xi_2$, and $\xi_3$ denote weights of IO load at now, 5 minutes ago and 15 minutes ago, respectively, and where $\xi_1 + \xi_2 + \xi_3 = 1$.

$$P_{IO,time\ i} = P_{IOPS,time\ i} + P_{Bandwidth,timeperiod\ i}$$

where $P_{IO,time\ i}$ denotes the IO load for a time i, which is a sum of an IOPS load metric at time i denoted $P_{IOPS,time\ i}$ and a bandwidth load metric at time i denoted $P_{Bandwidth,time\ i}$.

$$P_{IOPS,time\ i} = \frac{IOPS_{time\ i}}{IOPS_{max}}$$

$$P_{Bandwidth,time\ i} = \frac{Bandwidth_{time\ i}}{Bandwidth_{max}}$$

where $P_{IOPS,time\ i}$ denotes the IOPS load metric at time i as a percentage of the IOPS at time i denoted $IOPS_{time\ i}$ relative to a maximum theoretical IOPS value denoted $IOPS_{max}$, and where $P_{Bandwidth,time\ i}$ denotes the bandwidth load metric at time i as a percentage of the bandwidth at time i denoted $Bandwidth_{time\ i}$ relative to a maximum theoretical bandwidth value denoted $Bandwidth_{max}$.

$$C_{average} = \frac{C_{SPA} + C_{SPB}}{2}$$

where $C_{average}$ denotes the average workload or performance of a storage array or system as a whole, where the storage array or system includes two SPs denoted $C_{SPA}$ and $C_{SPB}$, respectively. For clarity of illustration, in the description below it is assumed that there are only two SPs in the storage array or system being considered. In other embodiments, however, a storage array or system may include any desired number of SPs, and the above equation and equations below may be adjusted accordingly.

$$\sigma = \sqrt{\frac{\sum_{i=0}^{N-1}(C_{SPi} - C_{average})^2}{N-1}} = \sqrt{(C_{SPA} - C_{average})^2 + (C_{SPB} - C_{average})^2}$$

where σ denotes the standard deviation of SP i's workload, and is a measure of how spread out SP workload or performance values are. Here, N=2 since there is assumed to be two SPs denoted SPA and SPB. A low standard deviation indicates that the SP workload or performance values for the SPs SPA and SPB tend to be close to the mean (also referred to as the expected value) of the set, while a high standard deviation indicates that the values are spread out over a wider range.

$$\phi = \frac{\sigma}{C_{average}}$$

where ϕ denotes the SP performance imbalance rate of the storage array or system. Θ is used to denote the acceptable threshold value of the imbalance rate of the system workload or performance, and Ω denotes the acceptable threshold value of the SP workload. If a SP's workload is higher than the threshold Ω, the algorithm may treat that SP as overloaded and initiate one or more workload balancing operations.

The dynamic multiple metric-based workload balancing algorithm will periodically evaluate the workload or performance of each SP. Continuing with the example above with two SPs SPA and SPB, $C_{SPA}$ and $C_{SPB}$ will be determined, along with the SP performance imbalance rate ϕ. There are multiple conditions which trigger workload balancing operations, including: (1) whether the imbalance rate ϕ exceeds the threshold value Θ; and (2) whether any SP's workload C exceeds the threshold value Ω. In some embodiments, if only condition (1) is met but not condition (2), then there is no need to perform workload balancing operations as each SP's workload is lower than the threshold value Ω and the algorithm considers that each SP can handle its own workload without negatively affecting performance or causing system issues. Thus, unnecessary resource consumption caused by performing workload balancing operations can be avoided. If both conditions (1) and (2) are met (where condition (2) should be met for at least one SP, not necessarily all of the SPs), then workload balancing operations are initiated.

Figure 5A:
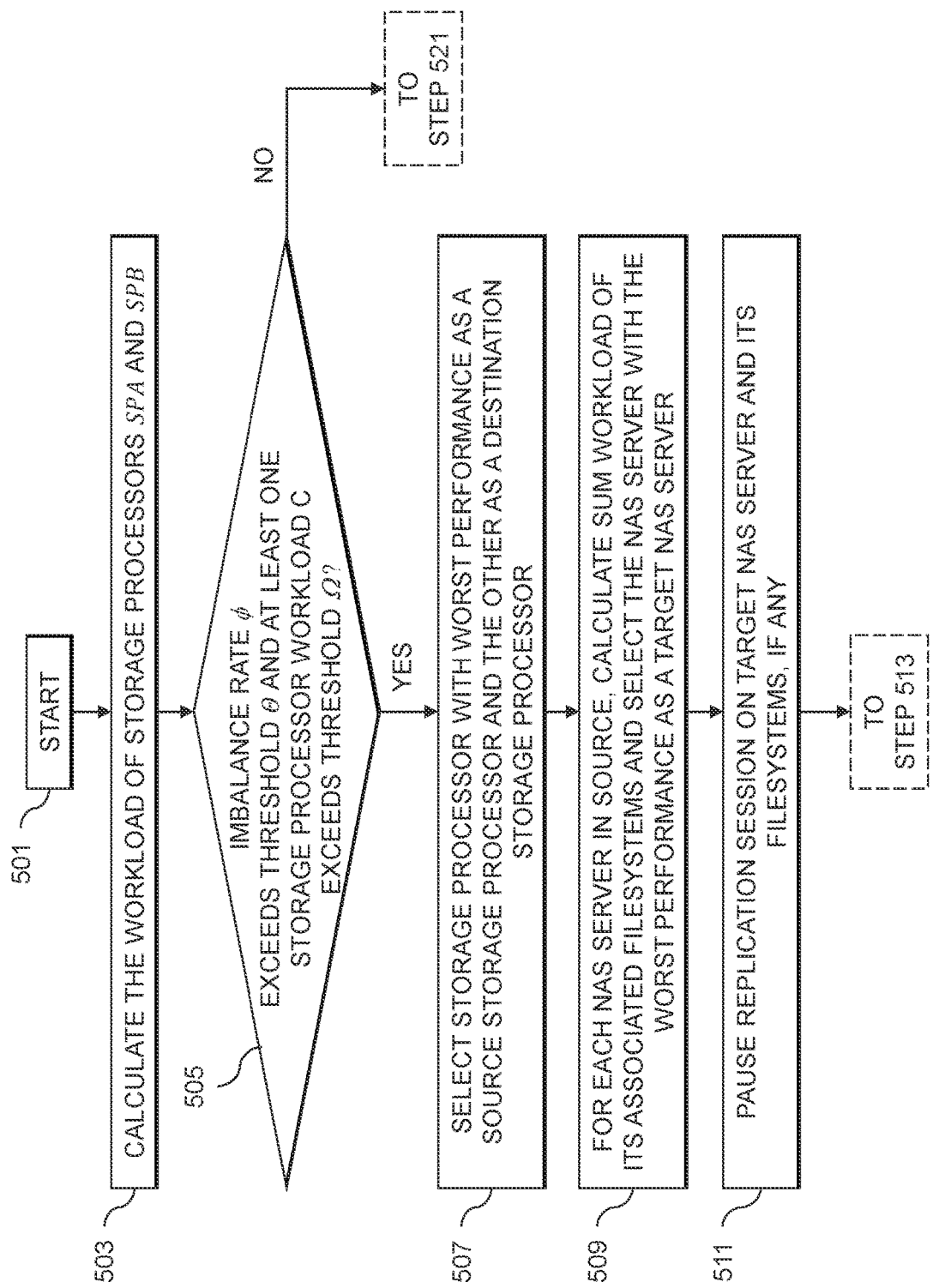
FIGS. 5A and 5B show a process flow for implementing workload balancing in an illustrative embodiment.
Figure 5B:
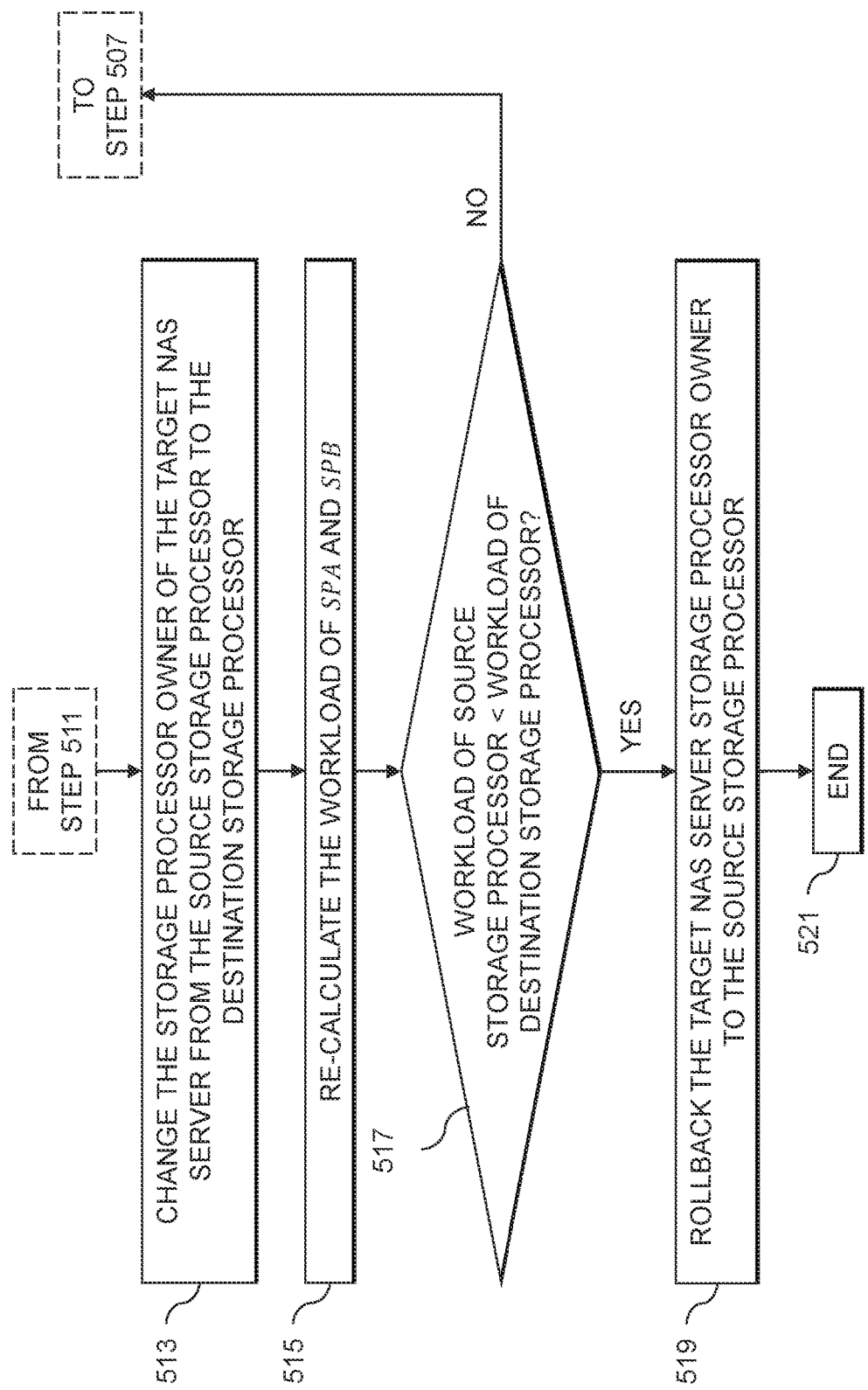

FIGS. 5A and 5B show a process flow illustrating the dynamic multiple-metric based workload balancing algorithm, including performance of workload balancing operations. As shown in FIG. 5A, the process flow starts in step 501, and the workload of SPs SPA and SPB are calculated in step 503. In step 505, a determination is made as to whether the imbalance rate ϕ (e.g., between SPA and SPB) exceeds the threshold value Θ and at least one of the SP's workload C exceeds the threshold Ω. If the result of the step 505 determination is no, the process ends in step 521. If the result of the step 505 determination is yes, the process proceeds to step 507.

In step 507, the SP with the worst performance (e.g., the SP with higher $C_{SP}$ among SPA and SPB in this example) is selected as a source SP and a SP with better performance is selected as a destination storage processor. In step 509, for each NAS server in the source SP that meets a SP owner change condition, a sum of the workloads of all filesystems created on that NAS server is calculated and the NAS server with the highest workload (worst performance), denoted $C_{Nas\ server}$, is selected as the target NAS server. Any replication sessions on the target NAS server and its filesystems are paused in step 511.

As shown in FIG. 5B, the process flow continues with step 513, where the SP owner of the target NAS server is changed from the source SP to the destination SP. In step 515, the workloads $C_{SPA}$ and $C_{SPB}$ of SPs SPA and SPB are re-calculated. In step 517, a determination is made as to whether the re-calculated workload of the source SP $C_{Source\ SP}$ is less than the re-calculated workload of the destination SP $C_{Destination\ SP}$ If the result of the step 517 determination is no, the process flow returns to step 507. If the result of the step 517 determination is yes, the process flow proceeds to step 519 where the change of the target NAS server's SP owner is rolled back to the source SP. The process flow then ends in step 521.

In the process flow of FIGS. 5A and 5B, it is assumed that the NAS servers may be moved in a transparent manner locally between SPs in the same storage array or system (e.g., between SPs in the same "cabinet"). Transparent local NAS server mobility between SPs in the same cabinet, conventionally, is only able to manually trigger NAS server movement between SPs. Automating balancing between SPs provides various advantages to avoid performance issues from occurring. In such cases, all replication sessions should be paused before a SP owner change. The local NAS server mobility, in some embodiments, has two limitations: the move is not transparent for all cases, only to specific environments (e.g., NFSv3 and SMB3+CA customer environments); and file import destination NAS servers are not allowed to move between SPs. These limitations may be taken into account when determining the target NAS server (e.g., only NAS servers meeting such conditions are eligible for selection as the target NAS server). It should be appreciated, however, that the above conditions and limitations are specific to one technology for transparent local NAS server mobility between SPs in the same cabinet, and do not necessarily apply to other types of technologies that enable movement of NAS servers among SPs.

Illustrative embodiments provide various advantages relative to conventional approaches. For example, some embodiments utilize a multiple metric-based workload balancing algorithm for NAS servers that takes CPU usage, memory usage and IO load metrics into account to trigger workload balancing operations between SPs by moving NAS servers between SPs to get better file performance and system reliability. This algorithm provides various benefits relative to approaches that perform balancing at a network level only (e.g., using link-aggregation approaches of NIC teaming). NAS server failover may be used when a SP fails or goes offline. The algorithms described herein, however, enable automatic triggering of workload balancing between SPs to avoid issues that may cause a SP to fail or go offline (e.g., OOM issues, SP panic, etc.). In the description above, it is assumed that file-based storage devices not block-based storage devices are used. Block devices may utilize multipath technology for performing workload balancing at the host side. Further, block side management granularity may be at the LUN level. If CPU, memory usage and IO load metrics are obtained at the LUN level, the techniques described above can be similarly applied to block storage devices to enhance block side workload balancing.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for performing multiple metric-based workload balancing between storage resources will now be described in greater detail with reference to FIGS. 6 and 7. Although described in the context of system 100, these platforms may also be used to implement at least portions of other information processing systems in other embodiments.

Figure 6:
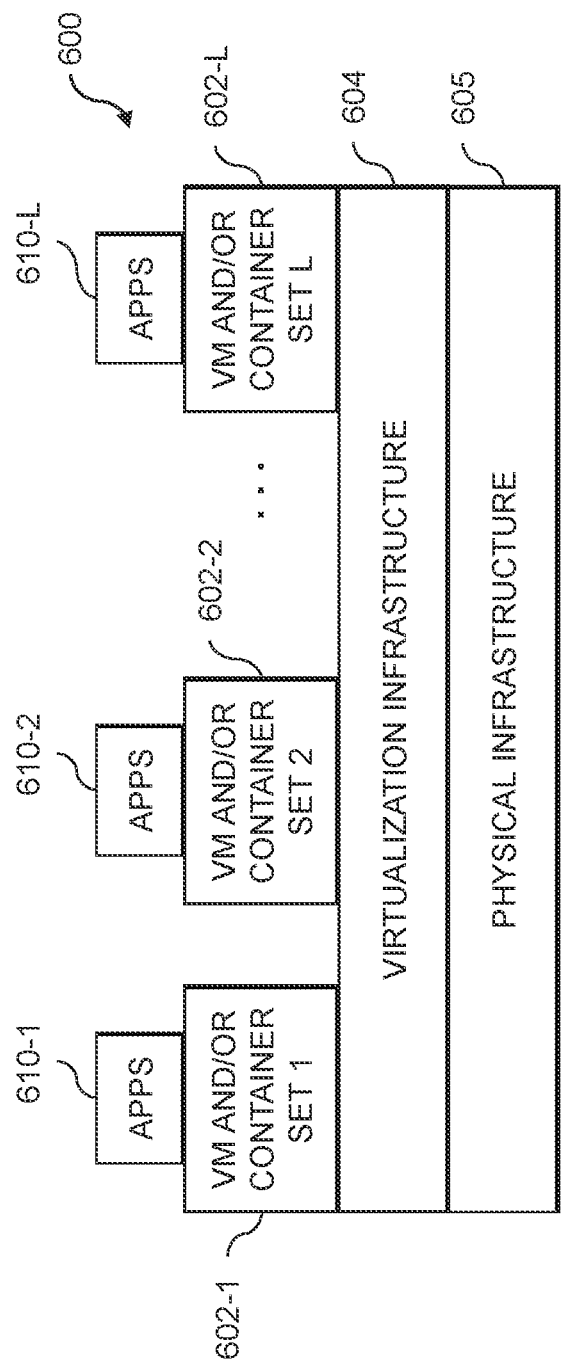
FIGS. 6 and 7 show examples of processing platforms that may be utilized to implement at least a portion of an information processing system in illustrative embodiments.
Figure 7:
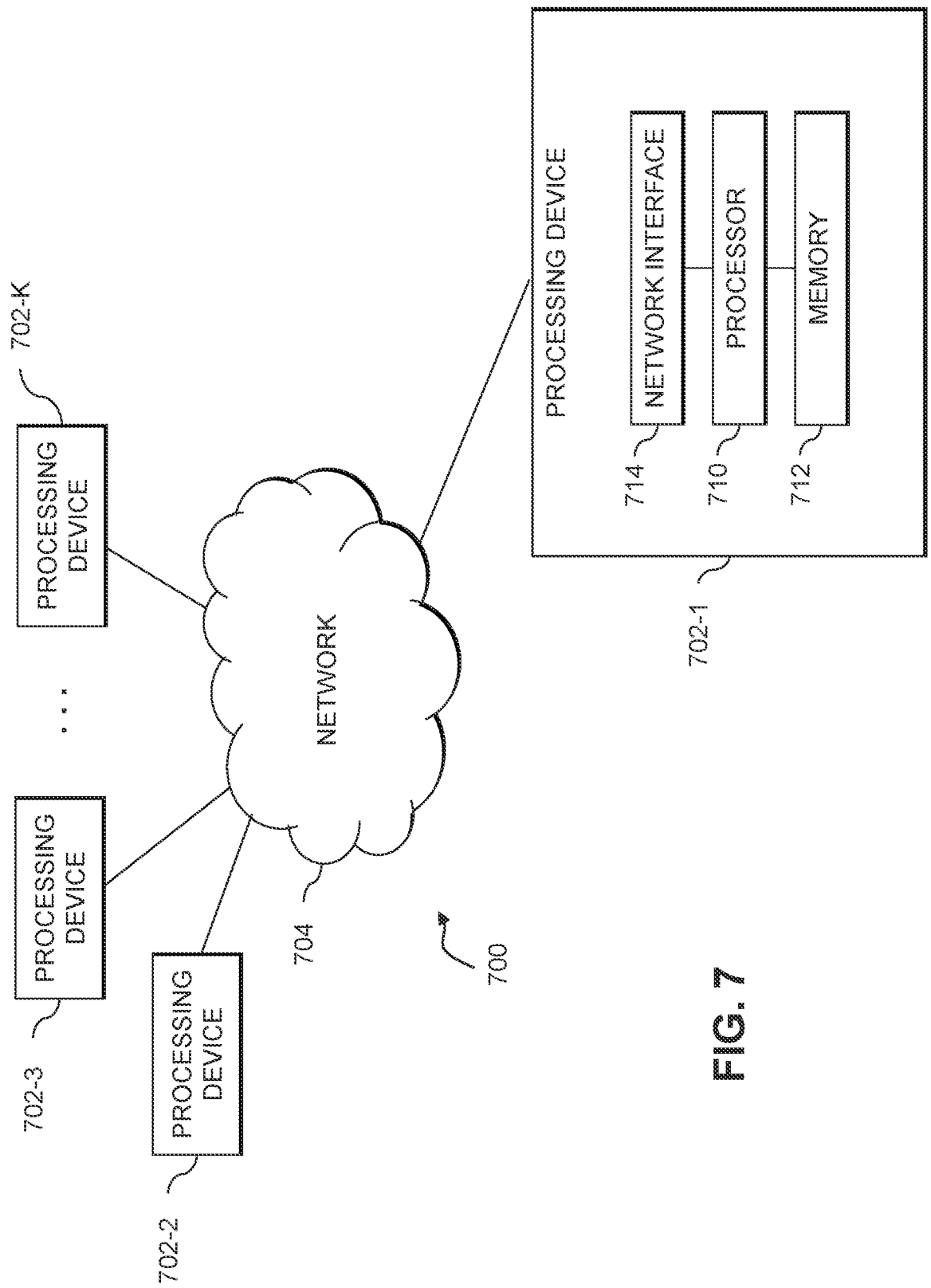

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for performing multiple metric-based workload balancing between storage resources as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, performance metrics, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
determining a first workload level for a first storage processor and a second workload level for a second storage processor, each of the first storage processor and the second storage processor running a set of network attached storage servers, each of the network attached storage servers being associated with one or more filesystems;
identifying whether at least one of the first workload level for the first storage processor exceeds a first threshold workload level and the second workload level for the second storage processor exceeds a second threshold workload level, wherein the first threshold workload level is different than the second threshold workload level;
identifying a performance imbalance rate between the first storage processor and the second storage processor; and
performing workload balancing for the first storage processor and the second storage processor responsive to (i) the performance imbalance rate exceeding a designated imbalance rate threshold and (ii) at least one of the first workload level for the first storage processor exceeds the first threshold workload level and the second workload level for the second storage processor exceeds the second threshold workload level;
wherein performing the workload balancing comprises migrating one or more network attached storage servers between the first storage processor and the second storage processor by:
(i) selecting one of the first storage processor and the second storage processor as a source storage processor and the other one of the first storage processor and the second storage processor as a destination storage processor;
(ii) for each of the set of network attached storage servers running on the source storage processor, calculating a sum of workloads for the one or more filesystems of that network attached storage server;
(iii) selecting, from among the set of network attached storage servers running on the source storage processor based at least in part on the calculated sums of workloads, one of the set of network attached storage servers as a target network attached storage server;
(iv) pausing replication sessions on the target network attached storage server and any filesystems associated with the target network attached storage server;
(v) changing a storage processor owner of the target network attached storage server from the source storage processor to the destination storage processor;
(vi) re-calculating the sums of workloads for the network attached storage servers running on the source storage processor and the destination storage processor; and
(vii) responsive to determining that the re-calculated sum of workloads for the set of network attached storage servers running on the source storage processor is greater than the re-calculated sum of workloads for the set of network attached storage servers running on the destination storage processor, selecting another target network attached storage server from among the set of network attached storage servers running on the source storage processor based at least in part on the re-calculated sums of workloads and repeating (v)-(vi) until a most recent re-calculated sum of workloads for the set of network attached storage servers running on the source storage processor is less than a most recent re-calculated sum of workloads for the set of network attached storage servers running on the destination storage processor.

2. The apparatus of claim 1 wherein the first storage processor and the second storage processor are part of a single storage system.

3. The apparatus of claim 1 wherein the first storage processor is part of a first storage system and the second storage processor is part of a second storage system, the second storage system being different than the first storage system.

4. The apparatus of claim 1 wherein the first workload level for the first storage processor is determined based at least in part on a weighted sum of two or more different processor usage metrics associated with two or more different time intervals.

5. The apparatus of claim 4 wherein the two or more different processor usage metrics comprise:
a first processor usage metric for a first one of the two or more different time intervals, the first processor usage metric characterizing a current state of processor usage of the first storage processor for a first time period relative to a current time;
a second processor usage metric for a second one of the two or more different time intervals, the second processor usage metric characterizing a recent state of processor usage of the first storage processor for a second time period relative to the current time, the second time period being longer than the first time period; and
a third processor usage metric for a third one of the two or more different time intervals, the third processor usage metric characterizing a persistent state of processor usage of the first storage processor for a third time period relative to the current time, the third time period being longer than the second time period.

6. The apparatus of claim 1 wherein the first workload level for the first storage processor is determined based at least in part on a weighted sum of two or more different memory usage metrics associated with two or more different time intervals.

7. The apparatus of claim 6 wherein the two or more different memory usage metrics comprise:
a first memory usage metric for a first one of the two or more different time intervals, the first memory usage metric characterizing a percentage of memory usage of the first storage processor at a first point in time relative to a current time;
a second memory usage metric for a second one of the two or more different time intervals, the second memory usage metric characterizing a percentage of memory usage of the first storage processor at a second point in time relative to the current time, the second point in time being less recent than the first point in time; and
a third memory usage metric for a third one of the two or more different time intervals, the third memory usage metric characterizing a percentage of memory usage of the first storage processor at a third point in time relative to the current time, the third point in time being less recent than the second point in time.

8. The apparatus of claim 6 wherein each of the two or more different memory usage metrics comprises a sum of a main memory usage, a cache memory usage, and a buffer memory usage.

9. The apparatus of claim 1 wherein first workload level for the first storage processor is determined based at least in part on a weighted sum of two or more different load metrics associated with two or more different time intervals.

10. The apparatus of claim 9 wherein the two or more different load metrics comprise:
a first load metric for a first one of the two or more different time intervals, the first load metric characterizing a percentage of load of the first storage processor at a first point in time relative to a current time;
a second load metric for a second one of the two or more different time intervals, the second load metric characterizing a percentage of load of the first storage processor at a second point in time relative to the current time, the second point in time being less recent than the first point in time; and
a third load metric for a third one of the two or more different time intervals, the third load metric characterizing a percentage of load of the first storage processor at a third point in time relative to the current time, the third point in time being less recent than the second point in time.

11. The apparatus of claim 9 wherein each of the two or more different load metrics comprises a sum of an input-output operations per second metric and a bandwidth metric for one of the two or more different time intervals, wherein the input-output operations per second metric is represented as a percentage of a designated maximum input-output operations per second, and wherein the bandwidth metric is represented as a percentage of a designated maximum bandwidth.

12. A computer program product comprising a non-transitory processor-readable storage medium having stored therein program code of one or more software programs, wherein the program code when executed by at least one processing device causes the at least one processing device to perform steps of:
determining a first workload level for a first storage processor and a second workload level for a second storage processor, each of the first storage processor and the second storage processor running a set of network attached storage servers, each of the network attached storage servers being associated with one or more filesystems;
identifying whether at least one of the first workload level for the first storage processor exceeds a first threshold workload level and the second workload level for the second storage processor exceeds a second threshold workload level, wherein the first threshold workload level is different than the second threshold workload level;
identifying a performance imbalance rate between the first storage processor and the second storage processor; and
performing workload balancing for the first storage processor and the second storage processor responsive to (i) the performance imbalance rate exceeding a designated imbalance rate threshold and (ii) at least one of the first workload level for the first storage processor exceeds the first threshold workload level and the second workload level for the second storage processor exceeds the second threshold workload level;
wherein performing the workload balancing comprises migrating one or more network attached storage servers between the first storage processor and the second storage processor by:
(i) selecting one of the first storage processor and the second storage processor as a source storage processor and the other one of the first storage processor and the second storage processor as a destination storage processor;
(ii) for each of the set of network attached storage servers running on the source storage processor, calculating a sum of workloads for the one or more filesystems of that network attached storage server;
(iii) selecting, from among the set of network attached storage servers running on the source storage processor based at least in part on the calculated sums of workloads, one of the set of network attached storage servers as a target network attached storage server;
(iv) pausing replication sessions on the target network attached storage server and any filesystems associated with the target network attached storage server;
(v) changing a storage processor owner of the target network attached storage server from the source storage processor to the destination storage processor;
(vi) re-calculating the sums of workloads for the network attached storage servers running on the source storage processor and the destination storage processor; and
(vii) responsive to determining that the re-calculated sum of workloads for the set of network attached storage servers running on the source storage processor is greater than the re-calculated sum of workloads for the set of network attached storage servers running on the destination storage processor, selecting another target network attached storage server from among the set of network attached storage servers running on the source storage processor based at least in part on the re-calculated sums of workloads and repeating (v)-(vi) until a most recent re-calculated sum of workloads for the set of network attached storage servers running on the source storage processor is less than a most recent re-calculated sum of workloads for the set of network attached storage servers running on the destination storage processor.

13. The computer program product of claim 12 wherein the first storage processor and the second storage processor are part of a single storage system.

14. The computer program product of claim 12 wherein the first workload level for the first storage processor is determined based at least in part on a weighted sum of two or more different processor usage metrics associated with two or more different time intervals.

15. The computer program product of claim 14 wherein the two or more different processor usage metrics comprise:
a first processor usage metric for a first one of the two or more different time intervals, the first processor usage metric characterizing a current state of processor usage of the first storage processor for a first time period relative to a current time;
a second processor usage metric for a second one of the two or more different time intervals, the second processor usage metric characterizing a recent state of processor usage of the first storage processor for a second time period relative to the current time, the second time period being longer than the first time period; and
a third processor usage metric for a third one of the two or more different time intervals, the third processor usage metric characterizing a persistent state of processor usage of the first storage processor for a third time period relative to the current time, the third time period being longer than the second time period.

16. The computer program product of claim 12 wherein the first workload level for the first storage processor is determined based at least in part on a weighted sum of two or more different memory usage metrics associated with two or more different time intervals.

17. The computer program product of claim 16 wherein the two or more different memory usage metrics comprise:
   a first memory usage metric for a first one of the two or more different time intervals, the first memory usage metric characterizing a percentage of memory usage of the first storage processor at a first point in time relative to a current time;
   a second memory usage metric for a second one of the two or more different time intervals, the second memory usage metric characterizing a percentage of memory usage of the first storage processor at a second point in time relative to the current time, the second point in time being less recent than the first point in time; and
   a third memory usage metric for a third one of the two or more different time intervals, the third memory usage metric characterizing a percentage of memory usage of the first storage processor at a third point in time relative to the current time, the third point in time being less recent than the second point in time.

18. The computer program product of claim 12 wherein first workload level for the first storage processor is determined based at least in part on a weighted sum of two or more different load metrics associated with two or more different time intervals.

19. The computer program product of claim 18 wherein the two or more different load metrics comprise:
   a first load metric for a first one of the two or more different time intervals, the first load metric characterizing a percentage of load of the first storage processor at a first point in time relative to a current time;
   a second load metric for a second one of the two or more different time intervals, the second load metric characterizing a percentage of load of the first storage processor at a second point in time relative to the current time, the second point in time being less recent than the first point in time; and
   a third load metric for a third one of the two or more different time intervals, the third load metric characterizing a percentage of load of the first storage processor at a third point in time relative to the current time, the third point in time being less recent than the second point in time.

20. A method comprising:
   determining a first workload level for a first storage processor and a second workload level for a second storage processor, each of the first storage processor and the second storage processor running a set of network attached storage servers, each of the network attached storage servers being associated with one or more filesystems;
   identifying whether at least one of the first workload level for the first storage processor exceeds a first threshold workload level and the second workload level for the second storage processor exceeds a second threshold workload level, wherein the first threshold workload level is different than the second threshold workload level;
   identifying a performance imbalance rate between the first storage processor and the second storage processor; and
   performing workload balancing for the first storage processor and the second storage processor responsive to (i) the performance imbalance rate exceeding a designated imbalance rate threshold and (ii) at least one of the first workload level for the first storage processor exceeds the first threshold workload level and the second workload level for the second storage processor exceeds the second threshold workload level;
   wherein performing the workload balancing comprises migrating one or more network attached storage servers between the first storage processor and the second storage processor by:
      (i) selecting one of the first storage processor and the second storage processor as a source storage processor and the other one of the first storage processor and the second storage processor as a destination storage processor;
      (ii) for each of the set of network attached storage servers running on the source storage processor, calculating a sum of workloads for the one or more filesystems of that network attached storage server;
      (iii) selecting, from among the set of network attached storage servers running on the source storage processor based at least in part on the calculated sums of workloads, one of the set of network attached storage servers as a target network attached storage server;
      (iv) pausing replication sessions on the target network attached storage server and any filesystems associated with the target network attached storage server;
      (v) changing a storage processor owner of the target network attached storage server from the source storage processor to the destination storage processor;
      (vi) re-calculating the sums of workloads for the network attached storage servers running on the source storage processor and the destination storage processor; and
      (vii) responsive to determining that the re-calculated sum of workloads for the set of network attached storage servers running on the source storage processor is greater than the re-calculated sum of workloads for the set of network attached storage servers running on the destination storage processor, selecting another target network attached storage server from among the set of network attached storage servers running on the source storage processor based at least in part on the re-calculated sums of workloads and repeating (v)-(vi) until a most recent re-calculated sum of workloads for the set of network attached storage servers running on the source storage processor is less than a most recent re-calculated sum of workloads for the set of network attached storage servers running on the destination storage processor; and
   wherein the method is performed by at least one processing device comprising a processor coupled to a memory.

* * * * *